March 5, 1968     D. D. RAHRIG ET AL     3,372,016
METHOD FOR TEMPERING AND CONVEYING GLASS SHEETS
Original Filed May 31, 1963
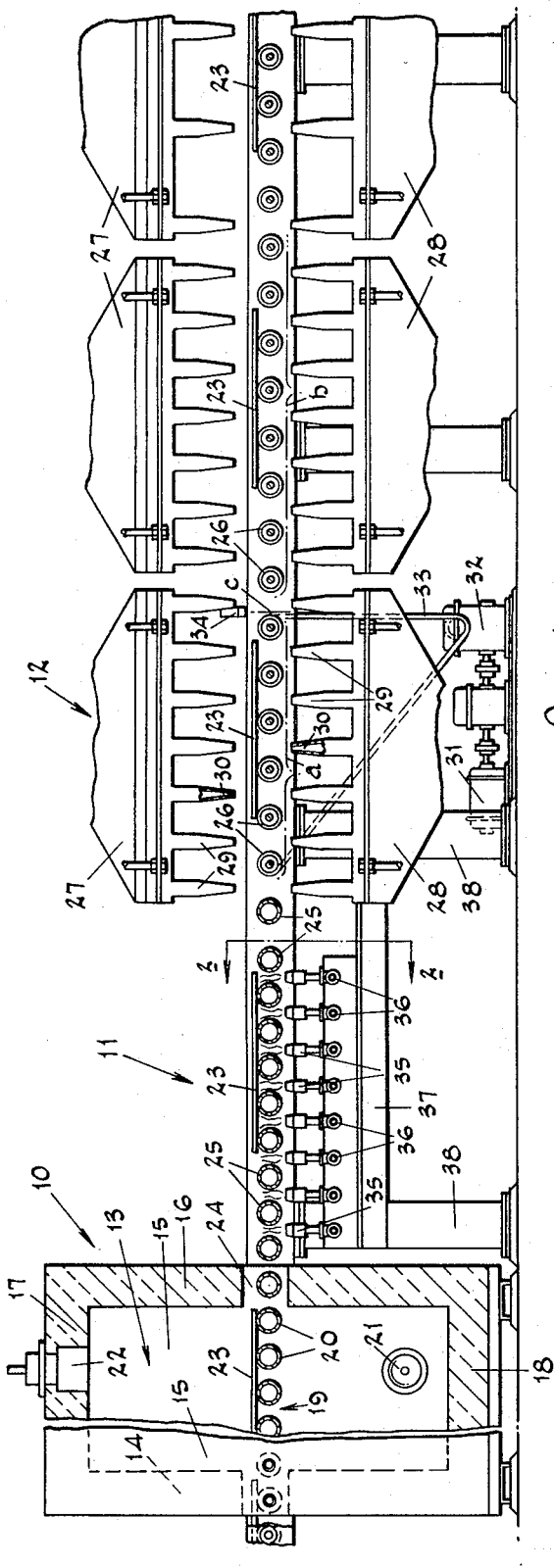
INVENTORS
Donald D. Rahrig,
Thomas B. O'Connell
and Charles W. Ferguson
BY Hobbe & Swope
ATTORNEYS United States Patent Office 3,372,016
Patented Mar. 5, 1968

3,372,016
METHOD FOR TEMPERING AND CONVEYING GLASS SHEETS
Donald D. Rahrig and Thomas B. O'Connell, Toledo, and Charles W. Ferguson, Perrysburg, Ohio, assignors to Libbey-Owens-Ford Glass Company, Toledo, Ohio, a corporation of Ohio
Continuation of abandoned application Ser. No. 284,585, May 31, 1963. This application July 7, 1966, Ser. No. 563,614
2 Claims. (Cl. 65—114)

ABSTRACT OF THE DISCLOSURE

A method of tempering glass sheets wherein the sheets are conveyed along a horizontal path through a heating zone and heated to substantially the softening point of the glass and then moved out of said zone and subjected to blasts of cooling air to temper the glass, all while supported upon and in contact with a roller conveyor. The top surface of the sheet is heated to a higher temperature than the bottom surface thereof as the sheet passes through the heating zone to bow the sheet upwardly. As the sheet leaves the heating zone, the bottom surface only is subsequently heated to equalize the temperatures in the sheet and remove the bow, and simultaneously with such subsequent heating a gaseous medium is applied to the bottom surface only of the sheet to increase the resistance thereof to breakage.

---

The application is a continuation of application Ser. No. 284,585, filed May 31, 1963, now abandoned.

The present invention relates to improvements in the tempering of glass sheets or plates.

This invention is of particular utility in the tempering of flat sheets or plates of glass in which the sheets to be tempered are carried horizontally through a furnace in which they are heated to substantially the softening point of the glass and then passed between spaced blower heads which direct blasts of cooling air against opposite surfaces of the sheets to temper them.

An important object of the invention is the provision of an improved method and apparatus for producing tempered glass sheets or plates according to the above procedure having increased resistance to breakage.

Another object of the invention is the provision of an improved method and apparatus for producing tempered glass sheets having more equalized strain properties in their opposite surfaces and in which such strain properties can be maintained over a longer period of time.

A further object of the invention is to provide a method and apparatus of the above character involving the initial heating of the glass sheets to substantially the softening point of the glass, additionally heating at least one sheet surface and substantially simultaneously contacting said surface with a gaseous medium and then suddenly cooling both surfaces of the sheets.

Other objects and advantages of the invention will become more apparent during the course of the following description when taken in connection with the accompanying drawings.

In the drawings, wherein like numerals are employed to desigate like parts throughout the same:

FIG. 1 is a longitudinal vertical section of heating and cooling apparatus provided by the invention and by which the method of the invention can be practiced;

FIG. 2 is a transverse vertical section taken on line 2—2 of FIG. 1; and

FIG. 3 is a plan view of a portion of the secondary heating section of the apparatus.

Referring now to the drawings, the apparatus provided according to the present invention includes generally a heating furnace 10, a secondary heating section 11 and a cooling or tempering section 12 arranged end to end in a substantially straight line.

The furnace 10 comprises a substantially closed heating chamber 13 defined by a front wall 14, side walls 15, a rear wall 16, roof 17 and floor 18. A roll conveyor 19 comprised of a series of spaced parallel rolls 20 extends through the chamber 13 for receiving and carrying the glass sheets or plates to be tempered through the furnace.

The heating chamber 13 can be maintained at regulated temperatures by burners 21 located in the side walls 15 beneath the roll conveyor and similar burners 22 in the roof 17. The burners 21 and 22 are preferably arranged in the chamber 13 in a manner to provide heat patterns or zones of progressively increasing temperatures, with the fuel supply to the burners usually being regulated to maintain proportionately lower tempertures beneath the conveyor 19 than above the conveyor. The purpose of maintaining a lower temperature beneath the conveyor is to maintain the bottom surfaces of the glass sheets at a relatively lower temperature than the upper surfaces to thereby reduce the tendency of distortion or marring of said surfaces by contact with the conveyor rolls. This also reduces the possibility of the sheets sticking to the conveyor rolls as well as reducing the likelihood of imperfections in the surfaces of the rolls being imparted to the sheet surfaces, or for the sheets to sag between the rolls.

As the glass sheets are carried through the furnace 10 they will be progressively heated from substantially room temperature to substantially the softening point of the glass, at which all strain will be removed. As herein contemplated, the glass sheets are heated to a temperature of from about 1140° F. to about 1220° F.

Upon reaching the exit end of the furnace the heated glass sheets 23 are passed through a slotted opening 24 in the rear wall 16 and are received on a series of conveyor rolls 25 in the secondary heating section 11, said rolls being disposed in alignment with the rolls 20 in the furnace. As will be more fully hereinafter described, as the glass sheets are carried along upon the conveyor rolls 25 of the secondary heating section, the undersurfaces of the sheets are additionally heated and a gaseous medium simultaneously applied thereto to increase the resistance of said surfaces to breakage.

Upon leaving the secondary heating section 11, the glass sheets are carried forwardly upon a series of conveyor rolls 26 between preferably three pairs of upper and lower blower heads 27 and 28, respectively, which are operable to direct blasts of cooling air upon opposi'e surfaces of the glass sheets in a well-known manner to temper the same. The blower heads may be provided with a series of independent nozzles through which the air is directed upon the sheets, or they may be provided, as herein shown, with spaced fins 29 extending transversely of the path of travel of the sheets and provided with slotted openings 30 to direct long narrow streams of air thereupon.

The degree of cooling of the glass is controlled by the pressure of the air directed thereagainst and differential air pressures are usually applied to the upper and lower sheet surfaces. The amount of pressure used is dependent upon the thickness of the glass sheets and relatively thin sheets are ordinarily subjected to a relatively higher pressure than thicker sheets. By way of example, a pressure of about 8″ to 27″ of water is applied to the upper surfaces of the glass sheets by the first upper blower head 27, and 5″ to 25″ of water pressure applied to the lower surfaces of the sheets by the lower blower head 28.

The air pressure directed upon the upper and lower surfaces of the sheets as they pass between the second pair of blower heads 27 varies from that of the first pair of blower heads. For example, the upper surfaces of the sheets are subjected to a pressure of about 8″ to 18″ of water and the bottom surfaces to a pressure of about 5″ to 15″ of water. When the glass sheets are passed between the third pair of blower heads the upper and lower surfaces of the sheets are subjected to substantially the same air pressure which is in the neighborhood of 6″ of water. It has been found desirable to maintain less pressure upon the bottom surfaces of the glass sheets as they pass between the first two pairs of blower heads to prevent warpage of the sheets due to the difference in temperature of the upper and lower surfaces of said sheets.

The conveyor rolls 20 adjacent the entrance end of the furnace, upon which the sheets are initially placed, are preferably driven at a linear speed of about 150 inches per minute, while the linear speed of the conveyor rolls adjacent the exit end of the furnace is about 1040 inches per minute. The conveyor rolls 25 in the secondary heating section 11 are also driven at a linear speed of about 1040 inches per minute so that the glass sheets are passed very rapidly from the furnace to and over the conveyor rolls of the secondary heating section to the cooling section 12 where they are received upon and carried forwardly by conveyor rolls 26.

As shown in FIG. 1, the initial group of conveyor rolls 26 between the first pair of blower heads 27 and 28 adjacent the secondary heating section 11 and designated by the bracket *a* are driven from a source of power 31 through a gear reducing unit 32 and endless chain drive 33. These rolls are alternately driven at a rate of speed comparable to the speed of the conveyor rolls 25 in the secondary heating section and at a reduced rate of speed equal to that of the conveyor rolls 26 of the adjoining section *b* which extends through the remainder of the cooling section 12. For this purpose, the speed differential of the conveyor rolls in section *a* is automatically controlled by a signal device 34, such as a photoelectric cell and receiver unit. When the glass sheets pass from the rolls 25 of the secondary heating section to the rolls 26 of section *a*, both sets of rolls will be driven at about 1040 inches per minute. However, when the leading edge of a glass sheet interrupts the signal beam *c* from the electric cell, the linear speed of the rolls of section *a* will be reduced to about 150 inches per minute, and when the following or trailing edge of the sheet passes from the line of the beam the speed of the rolls will be automatically returned to 1040 inches per minute.

In the tempering of glass sheets, it is preferred that the opposite surface layers thereof be heated to the same temperature and rapidly cooled by air blasts of substantially equal pressure to obtain the same compressional strain in both surfaces of the sheet. However, when glass sheets are passed horizontally through a furnace upon conveyor rolls, as herein disclosed, the lower surfaces of the sheets cannot be heated to as high a temperature as the upper surfaces. Were this done, the highly heated lower surfaces would be susceptible to surface imperfections in the conveyor rolls and might even adhere or stick to the rolls. Under certain circumstances, it is also known that the sheets will become distorted by sagging between the conveyor rolls. On the other hand, this lesser heating of the lower surfaces of the glass sheets results in reduced resistance to breakage of said surfaces as compared with the upper surfaces which are subjected to a higher temperature.

The present invention therefore contemplates an additional or secondary heating of the undersurfaces of the glass sheets upon leaving the furnace and before cooling to bring the said lower sheet surfaces to a temperature more nearly equal to the temperature of the upper sheet surfaces. This is accomplished by the provision of the secondary heating section 11. More particularly, there are provided beneath the conveyor rolls 25 a plurality of burners 35 arranged in rows between the adjacent conveyor rolls. These burners are mounted on suitable piping 36 supported by brackets 37 on the pedestals 38 of the furnace structure, with the pipe 36 for each row of burners being connected at one end to a supply pipe 39 connected to fuel supply pipes 40 and 41 through a conventional mixer 42. As shown in FIG. 3, the burners in adjacent rows are staggered with respect to one another to give a more uniform heating pattern.

Although the glass sheets are carried by the conveyor rolls 25 over the burners at a relatively high speed, the period of time is sufficient to enable the temperature of the lower sheet surfaces to be raised to substantially that of the upper sheet surfaces. This additional heating of the lower surfaces of the sheets serves to more nearly balance the thermal conditions in the upper and lower sheet surfaces thereby resulting, as nearly as possible, in the same characteristics in one surface as in the other surface when the sheets are suddenly cooled. By passing the highly heated sheets over the conveyor rolls 25 at a relatively high speed, the tendency of the sheets to stick to or sag between the rolls or be marred thereby is avoided.

Another important aspect to the invention resides in the discovery that by reacting the lower surfaces of the glass sheets, as they are being heated by the burners 35, with a selected chemical in the form of a gas, the physical properties of the lower sheet surfaces will be improved and the strength of the tempered sheets increased.

For this purpose, a gas, such as sulphur trioxide ($SO_3$), is introduced into the mixer 42 from supply pipe 43 and directed against the lower surfaces of the glass sheets simultaneously with the heating flames from the burners 35. The period of exposure of the lower sheet surfaces to the gas, while relatively short in duration of time, has been found sufficient to produce a reaction with the sodium oxide ($Na_2O$) of the subsurface layer of the sheets to form sodium sulfate ($Na_2SO_4$) in said layer without loss of transparency. By way of example, the burners 35 are supplied a combustible gas regulated to about 4 inches water pressure while the $SO_3$ gas is added to the combustible gas at a rate of approximately 5 cubic feet per hour.

The results of tests conducted upon glass sheets tempered without the additional heating and gaseous treatment of the lower surfaces thereof, showed that such sheets had less resistance to breakage than glass sheets tempered according to the present invention. It was also found that by applying the $SO_3$ gas to the bottom sheet surfaces a decrease in strength of the glass, which apparently takes place immediately after tempering, is materially delayed. In fact, the tests indicated that not only was the strength of the bottom surfaces of the glass sheets increased by the auxiliary heating of said surfaces but also that this strength was maintained or preserved by applying the $SO_3$ gas thereto.

While the present invention is not limited to the treatment of glass sheets of any particular thickness, it has been found that the method of this invention is particularly effective in treating relatively thin sheets, for example, sheets having a thickness of $7/32$″ or less.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:
1. A method of tempering glass sheets, which comprises passing a flat sheet of glass along a substantially horizontal path through a heating zone upon and in contact with a plurality of spaced lines of transverse support, heating the sheet as it moves through said zone to sub- stantially the point of softening of the glass while heating the top surface of the sheet to a relatively higher temperature than the bottom surface thereof to cause an upward bowing of said sheet, passing the sheet from said heating zone, subsequently applying heat directly to the bottom surface only of the sheet as said sheet leaves said heating zone and while it continues to move along said path upon and in contact with spaced lines of transverse support to raise the temperature of the bottom surface of the sheet to a temperature more nearly equal to but not above the temperature of the top surface of the sheet whereby the upward bow is substantially eliminated, applying sulphur trioxide directly to the bottom surface only of the sheet simultaneous with the subsequent heating thereof to increase the resistance of said surface to breakage, and then simultaneously subjecting the opposite surfaces of the sheet to blasts of cooling air to temper said sheet as it continues to travel along said path.

2. A method of tempering glass sheets as defined in claim 1, in which the subsequent heating of the bottom surface of the sheet is effected by directing a combustible gas against said surface, and in which sulphur trioxide is mixed with the combustible gas and directed therewith against the bottom surface of the sheet.

References Cited
UNITED STATES PATENTS

| | | | |
|---|---|---|---|
| 1,973,501 | 9/1934 | Murgatroyd | 65—30 |
| 3,245,772 | 4/1966 | Cypher et al. | 65—111 |

DONALL H. SYLVESTER, *Primary Examiner.*

ARTHUR D. KELLOGG, *Examiner.*